June 28, 1938.   R. K. LEE   2,121,876
VEHICLE BODY MOUNTING
Filed July 27, 1933   4 Sheets-Sheet 1

INVENTOR
ROGER K. LEE.
BY
ATTORNEYS

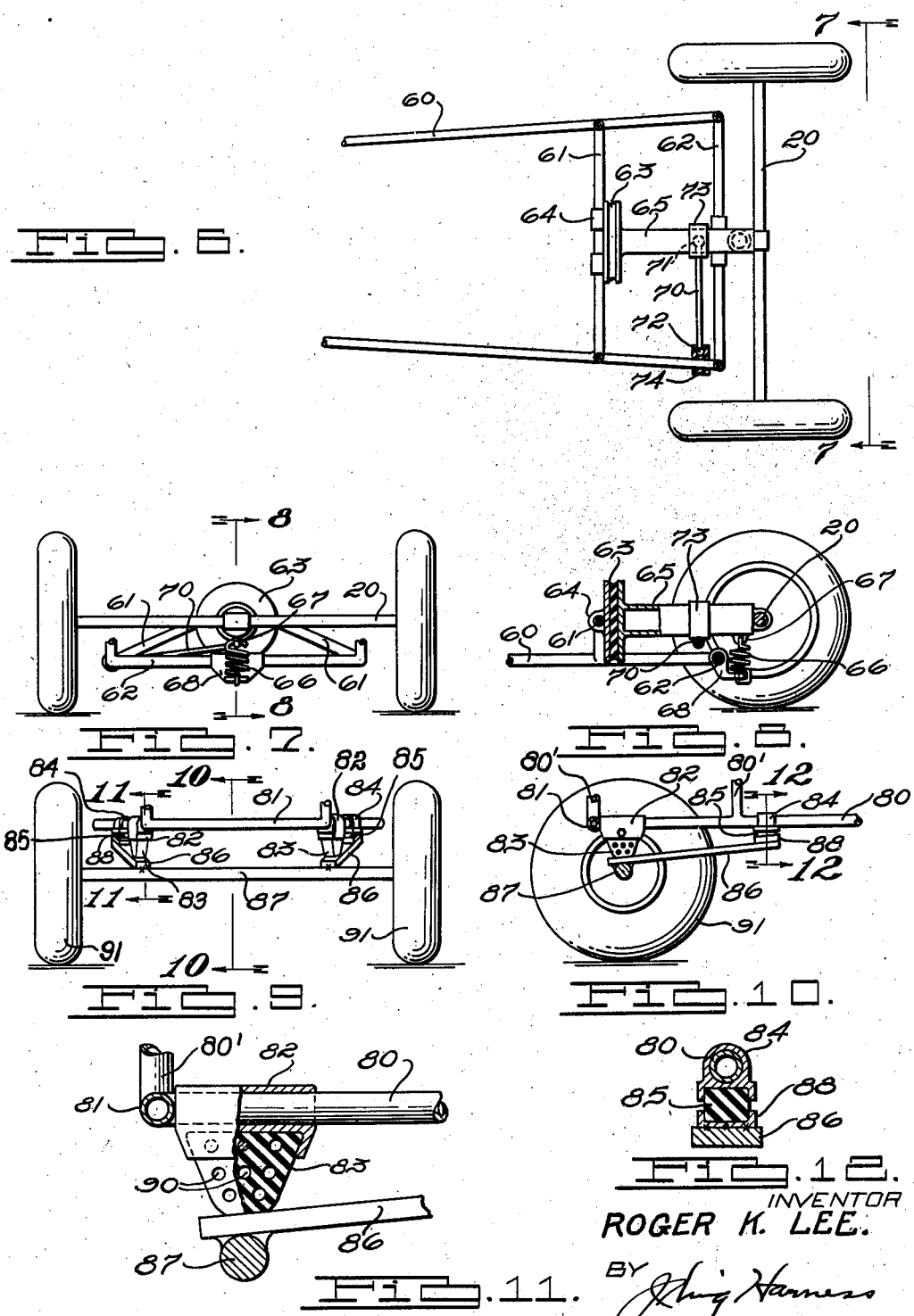

June 28, 1938.  R. K. LEE  2,121,876

VEHICLE BODY MOUNTING

Filed July 27, 1933  4 Sheets-Sheet 3

INVENTOR
ROGER K. LEE.
BY
ATTORNEYS

Patented June 28, 1938

2,121,876

UNITED STATES PATENT OFFICE 2,121,876

VEHICLE BODY MOUNTING

Roger K. Lee, Highland Park, Mich., assignor to Chrysler Corporation, Detroit, Mich., a corporation of Delaware Application July 27, 1933, Serial No. 682,360

9 Claims. (Cl. 280—106.5)

This invention relates to vehicle body mountings and especially to spring suspension constructions or their equivalents for yieldably mounting a vehicle body relative to the running gear of the vehicle.

Spring suspension constructions usually connect the vehicle body to the running gear at four points on the latter to support the body relative to the running gear; to act as a cushion for protecting the vehicle body and occupants and machinery carried thereby from vibration and shock; and to give side stability to the vehicle body relative to the running gear. The spring suspension means is normally connected at two spaced points on both the front and rear axle assemblies of the running gear so that the suspension means will not only support the vertical load but will afford resistance to side sway of the vehicle body. Difficulty has been experienced, however, in designing spring suspension constructions which will have the proper build-up rate for resiliently resisting both vertical and transverse loads.

The principal object of this invention is to provide an improved vehicle body mounting.

Another object of the invention is to provide independent means for carrying vertically arranged loads and for affording side stability.

Another object is to provide spring means for carrying vertical loads and independent means for affording side stability, the build-up rate of each of these means being independent of that of the other.

Another object is to pivotally mount a vehicle body upon a running gear and to provide torsional resistance for controlling the pivotal movement of the body with respect to the running gear.

Another object is to pivotally connect a vehicle body and running gear about an axis extending through or above the center of gravity of the vehicle body plus an estimated average load.

Another object is to provide torsional resistance means for controlling side sway of a vehicle body.

Another object is to provide a vehicle body mounting construction which permits the rear wheels of the vehicle to have a tendency to track the front wheels as the vehicle is turned.

Another object is to provide means for steering the rear wheels of a vehicle so as to cause these wheels to track the front wheels as the vehicle is turned.

Another object is to provide a simplified mounting for connecting a vehicle body and the front axle assembly of the running gear therefor.

Other objects and advantages will become apparent from the following description and appended claims taken in conjunction with the accompanying drawings which illustrate concrete embodiments of the invention, and in which:

Figure 1:
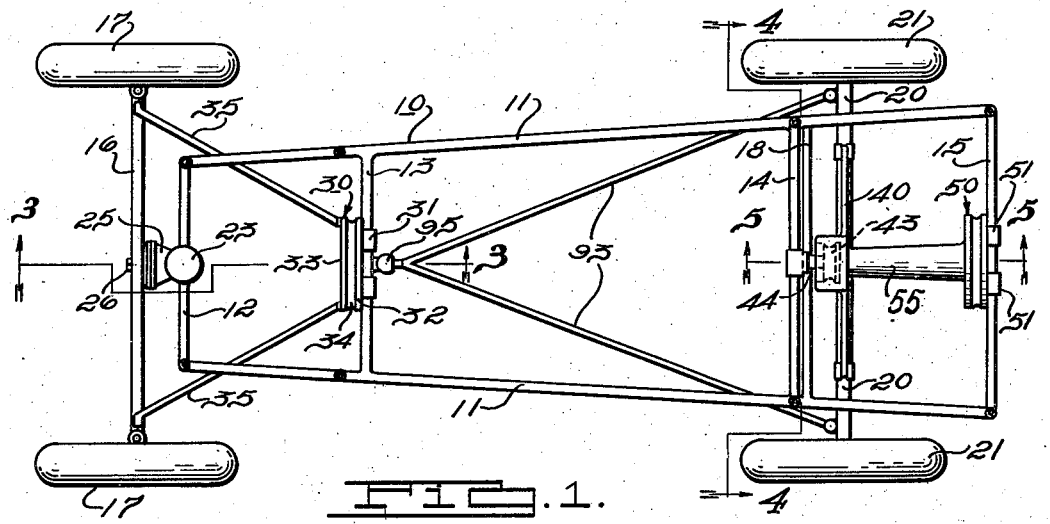
Figure 1 is a top plan, essentially diagrammatic in form, of an automobile running gear, a portion of a body frame, and the mounting means for connecting the body frame and running gear.
Figure 2:
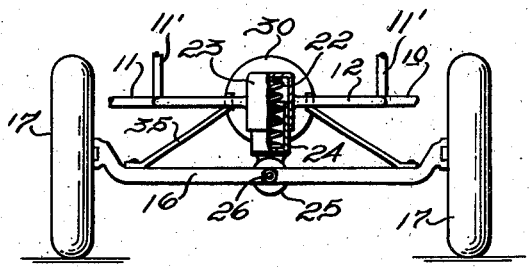
Fig. 2 is a front elevation, partly in section, of the construction shown in Fig. 1 as viewed from the front of the vehicle.
Figure 3:
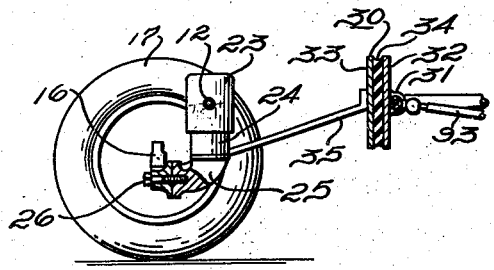
Figure 4:
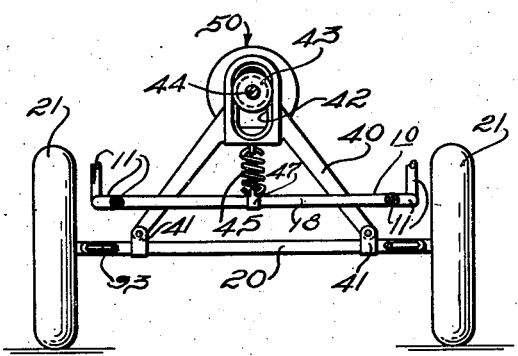
Figure 5:
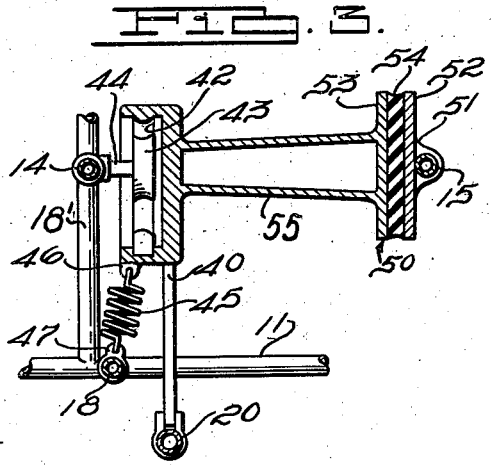
Figure 13:
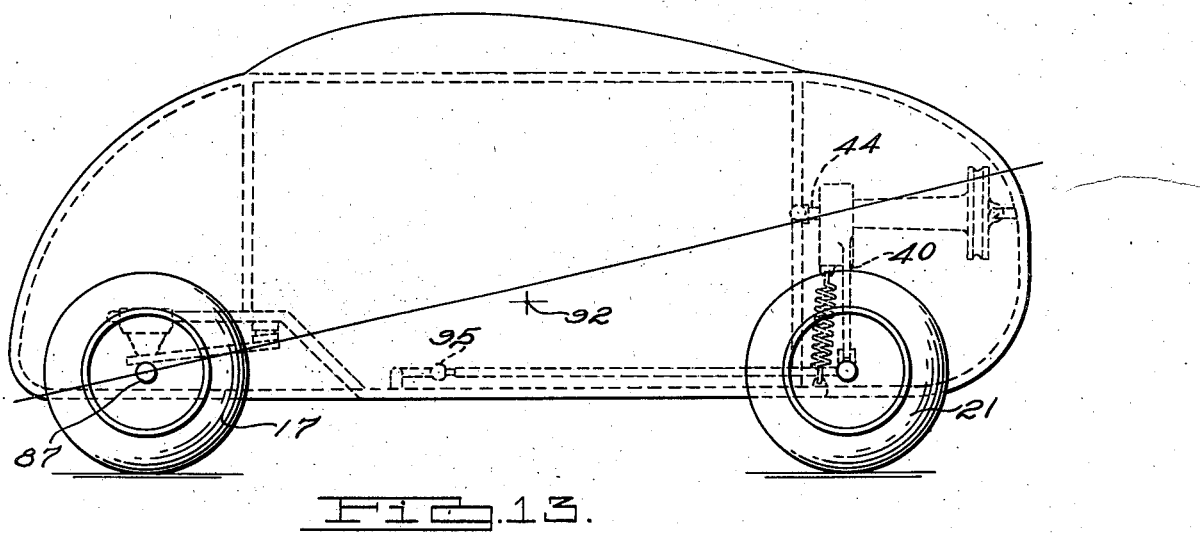
Figure 14:
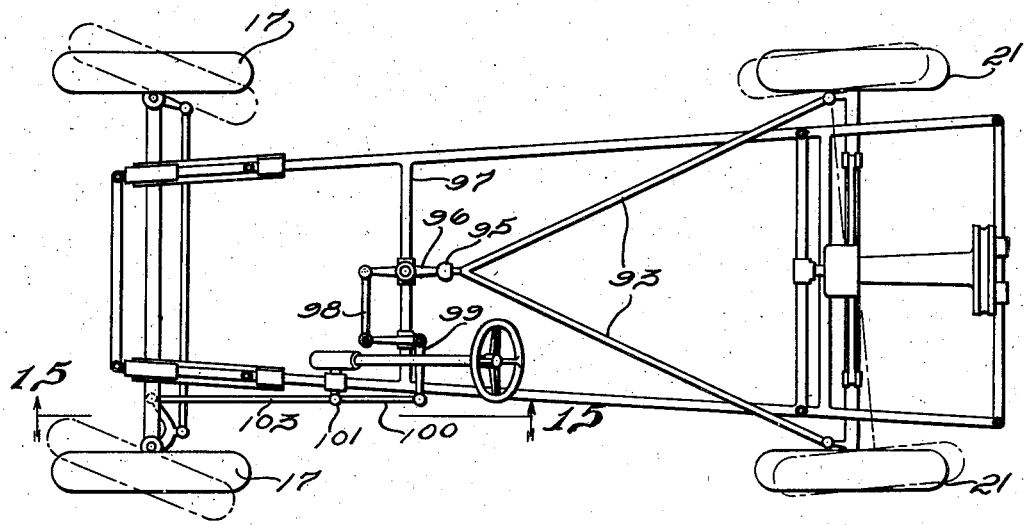
Figure 15:
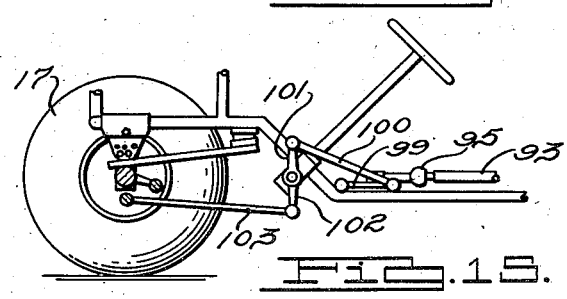
Figure 16:
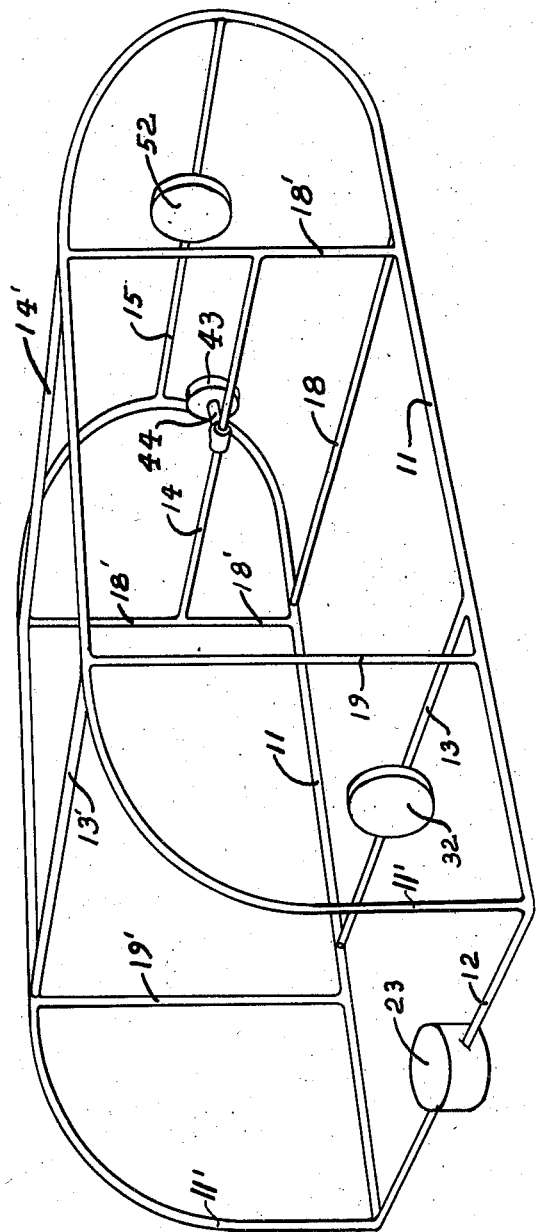

Figs. 3, 4 and 5 are sections on the lines 3—3, 4—4 and 5—5 respectively of Fig. 1;

Fig. 6 is a fragmentary view, similar to Fig. 1 of a modified form of mounting means;

Fig. 7 is a rear elevation of the construction shown in Fig. 6, the view being taken as indicated by the line 7—7 of Fig. 6;

Fig. 8 is a section on the line 8—8 of Fig. 7;

Fig. 9 is a front elevation, similar to Fig. 2, of another form of mounting means;

Fig. 10 is a section on the line 10—10 of Fig. 9;

Figs. 11 and 12 are enlarged sections on the lines 11—11 and 12—12 of Figs. 9 and 10 respectively;

Fig. 13 is a side elevation of an automotive vehicle having the form of mounting means shown in Figs. 1, 4 and 5 at the rear portion of the vehicle and having the mounting means disclosed in Figs. 9 to 12, inclusive, at the front portion of the vehicle;

Figs. 14 and 15 are top plan and side elevational views of steering apparatus which may be employed in conjunction with the mounting means shown in Fig. 13; and Fig. 16 is a view in perspective illustrating in particular the body frame.

Referring to the drawings, and more especially to Figs. 1 to 5 inclusive, the numeral 10 designates the frame of the body of an automotive vehicle, which frame comprises side sills 11 and cross members 12, 13, 14, 15 and 18. The numeral 16 indicates the front wheel axle assembly carrying steerable front wheels 17 and the numeral 20 indicates the rear axle assembly carrying the rear wheels 21 of the running gear of the vehicle. The side sills 11, as illustrated in Fig. 16, are reversely bent to form both the upper and lower body rails and also provide the forwardly disposed uprights 11'. A pair of uprights 18' connects the upper and lower rails 11 and the cross member 14 is connected to these uprights. Another pair of uprights 19 connects the rails 11 at the forward portion thereof, while the upper side rails 11 are connected by longitudinally spaced cross members 13' and 14'.

Referring more especially to Figs. 1, 2 and 3, the front end of the body frame 10 is supported to the front axle assembly 16 by means of a vertically disposed spring 22 extending between the midpoint of the cross member 12 and the midpoint of the axle assembly 16. The spring is preferably in the form of a coil spring and is received within the telescoping cylinders 23 and 24, the cylinder 23 being closed at its upper end and integral with or secured to the front cross member 12 at the midpoint thereof, and the cylinder 24 being closed at its lower end and having a downwardly and forwardly extending bracket 25 which is pivotally connected to the midpoint of the axle assembly 16 by means of a pivot pin or bolt 26. The telescoping cylinders 23 and 24 will restrict the midpoint of the axle assembly 16 to movement in a path parallel to the axes of these cylinders. The spring 22 is preferably made quick resistant to spring deflection since excessive movement of the front axle assembly would affect steering of the vehicle. The spring 22 resiliently supports the front end of the frame 10 relative to the axle assembly and offers no resistance to rotative movement of the body frame relative to the axle assembly and about the pivot pin 26. Rotative movement of the front end of the body frame 10 relative to the axle assembly 16 with the pivot pin 26 as a center is opposed by a torsional resistance member 30 pivotally connected by means of sleeves 31 to the torque member 13. The torsional resistance member 30 preferably comprises a pair of plates 32 and 33 vulcanized or otherwise securely bonded to an interposed block or disc 34 of rubber or other suitable resilient material. The central longitudinal axis of the torsional resistance member 30 preferably coincides with the central longitudinal axis of the bottom portion of the frame 10. Rotation of the plate 32 about the axis of the torsional resistance member is prevented by the sleeves 31 fixed to the plate 32. Rotation of the plate 33 about the axis of the torsional resistance member 30 must overcome the torsional resistance of the block or disc 34. Rotation of the axle assembly 16 relative to the plate 33 is prevented by tie rods 35 rigidly secured at diametrically opposite points adjacent the periphery of the plate 33 and to points adjacent the ends of the axle assembly 16. The tie rods 35 are of comparatively light construction and function principally as tension members in preventing rotation of the axle assembly 16 relative to the plate 33. Rotational movement of the frame 10 relative to the axle assembly is opposed by the torsional resistance of the rubber block or disc 34 which is applied through the medium of the plate 33 and the tie rods 35. The rubber block or disc 34 may yield slightly in the direction of the axis of the torsional resistance member 30 to permit vertical movement of the midpoint of the axle assembly 16 with respect to the vehicle body.

Referring more especially to Figs. 1, 4 and 5, the spring suspension means and means for preventing side sway of the vehicle body relative to the rear axle will be described. An inverted substantially V-shaped frame 40 is secured at the free ends of the legs thereof by means of collar members 41 to points adjacent the ends of the rear axle assembly 20 and is provided with a vertically disposed slideway 42 at the upper apex of the frame. A roller 43 is disposed within the slideway 42 and is pivotally mounted to a standard 44 fixed to the cross member 14 and extended rearwardly therefrom. The roller 43 serves as the pivot about which the frame 40 and the rear axle assembly 20 may rotate. A tension spring 45, preferably in the form of a coil spring, extends between an ear 46 arranged on the frame 40 directly below the slideway 42 and an ear 47 fixed to and arranged adjacent the midpoint of the cross member 18 of the frame 10. The tension spring 45 resiliently supports a rear end of the frame and body relative to the rear axle assembly 20 but does not materially oppose rotation of the frame and body relative to the axle assembly about the standard 44 or roller 43. Rotation of the rear end of the body relative to the rear axle assembly 20 is opposed by a torsional resistance member 50 similar to the torsional resistance member 30 previously described. The torsional resistance member 50 is pivotally connected by sleeves 51 to the cross member 15. This torsional resistance member comprises the plates 52 and 53 vulcanized or otherwise securely bonded to a resilient block or disc 54 of rubber or other suitable material interposed between the plates. The plate 53 is connected by a tubular member 55 to the frame 40 to prevent relative rotation between the plate 53 and the frame 40.

Rotation of the axle assembly 20 relative to the frame 10 is opposed by the block or disc 54 of resilient material. The torsional resistance offered by the block 54 may be made such as to afford the desired resistance to sway of the rear portion of the vehicle frame 10.

Referring to Figs. 6, 7 and 8, another form of spring suspension and torsional resistance means is disclosed. In this embodiment a frame 60 includes cross members 61 and 62. A torsional resistance member 63, similar to those previously disclosed, is pivotally connected by sleeves 64 to the cross member 61 and is connected by means of a tubular member 65 to the rear axle assembly 20. A tension spring 66, similar to the spring 45 of the previous embodiment, extends between an ear 67 secured to the tubular member 65 adjacent the rear axle assembly 20 and a rearwardly extending bracket 68 fixed to the cross member 62. The spring 66 resiliently supports the rear end of the frame 60 relative to the rear axle assembly 20 but affords no material opposition to pivotal movement of the rear axle assembly relative to the frame. Relative rotation of the frame and rear axle assembly is opposed by the torsional resistance member 63 in much the same manner as in the previously described embodiment. In the present embodiment, however, the rear axle assembly 20 is connected to the frame of the vehicle only through the springs 66, the tubular member 65 and the torsional resistance member 63 so that it would be difficult to keep the rear wheels in alignment with the frame 60. To prevent material misalignment of the rear axle assembly 20 relative to the frame 60, a tie rod 70 is provided with spherical end portions 71 and 72, the end portion 71 being received in a socket provided in a collar member 73 fixed to the tubular member 65 and the spherical end portion 72 is embedded in a rubber block 74 secured to a side rail of the frame 60.

Referring to Figs. 9 to 12 inclusive, a resilient suspension means is shown which is particularly adaptable for the front end of the vehicle and which may be employed in conjunction with the spring suspension and torsional resistance means disclosed in the previously described embodiment. In this construction an automotive vehicle frame includes side sills 80, uprights 80', and a cross member 81. The upper and lower side sills 80 are connected by uprights 80'. To the side sills 80 adjacent the cross member 81 is secured a downwardly opening cup-like member 82 in which a rubber block is vulcanized or otherwise securely attached. Another downwardly opening cup member 84 is secured to the side rails 80 of the vehicle frame and has a block 85 of rubber or other suitable resilient material vulcanized or otherwise securely attached therein. A bar member 86 is secured, preferably welded, to an axle assembly 87 adjacent an end thereof and the other end of the bar member is provided with an upwardly opening cup-like member 88 to which the block 85 is vulcanized or otherwise securely attached. There are provided two bar members 86 one disposed beneath each of the side rails of the vehicle frame with the block 83 pressing on the top of the bar member at a point directly above the axle assembly 87. The blocks 83 are preferably perforated as indicated at 90 so that the rubber or other resilient material of which the block is composed is more easily displaceable to increase the resiliency of the block. Preferably low pressure and large section tires 91 are employed in conjunction with this resilient supporting means so that the combined cushioning properties of both the large section tires and the resilient supporting means described are utilized.

Referring to Fig. 13, a vehicle utilizing the resilient supporting means described relative to Figs. 9 to 12 inclusive, is employed at the front of the vehicle and a spring suspension and torsional resistance means such as described relative to Figs. 1, 4 and 5 is employed at the rear end of the vehicle. Referring more particularly to Figs. 1 and 13, it will be noted that the body is pivoted relative to the axle assembly at approximately the midpoint of the axle assembly 87 at the front of the vehicle and about the support 44 as a pivot at the rear portion of the vehicle. A line joining these pivot points of the structure shown in Figs. 1 and 13 passes through or slightly above the center of gravity of the vehicle body, indicated at 92. With the center of gravity at or adjacent a line connecting the pivotal points about which the body may rotate relative to the axle assemblies, there is little or no tendency for the body to sway relative to the axle assemblies when the vehicle is traveling at high rates of speed on a curved path. By locating the center of gravity slightly below the line joining the pivotal points of connection between the vehicle body and the axle assemblies, the body will have a tendency to sway inwardly relative to the curved path rather than outwardly as would be the case when the center of gravity of the body is located above the pivotal point of connection between the body and the axle assemblies. A fork member 93 may be provided for the axle assembly 20 and connected adjacent the wheels to the axle assembly at the free ends of the legs of the fork and connected by means of a universal joint 95 to the midpoint of the cross member 13. With the construction disclosed in Figs. 1 and 13, a car negotiating a curve at high speed will cause the body of the vehicle to have a tendency to move outwardly relative to the axle assembly and to cause the axle assembly 20 and fork 93 to rotate about the pivots afforded by the roller 43 and the universal joint 95 so that the body will move slightly in the direction of the outer wheel at the rear of the vehicle. This will cause the axle assembly 20 and fork 93 to swing slightly about the universal joint 95 and to cause the wheels 21 of the vehicle to point in the opposite direction from that in which the wheels 17 are steered. This will cause the rear wheels 21 to come closer to tracking the front wheels than in the case of the conventional vehicle.

Referring to Figs. 14 and 15, the tendency of the rear wheels 21 of the vehicle to track the front wheels 17 may be increased by actually moving the universal joint 95 as the vehicle is steered. In this construction the universal joint 95 is mounted on an arm 96 pivoted at an intermediate point to a cross member 97 of the vehicle frame and connected by means of a link 98, a bell crank 99 and a link 100 to an arm 101 diametrically opposed to the steering arm 102 of the steering mechanism for the vehicle. In steering the vehicle to the right as indicated by the dot-and-dash line in Fig. 14, the drag link 103 would be drawn rearwardly with respect to the frame of the vehicle by the counter-clockwise rotation of the steering arm 102, as viewed in Fig. 14, causing rotation of the arm 101 in the same direction and moving the link 100 forwardly, causing clockwise rotation of the bell crank 99 and lever 96 and downward movement of the universal joint 95, as viewed in Fig. 14. This causes the rear wheels 21 of the vehicle to turn in the opposite direction from which the front wheels 17 are steered so that the rear wheels 21 are caused to approximately track the front wheels of the vehicle. This enables the vehicle to negotiate sharper corners and also lessens the side strain on the tires and rear wheels of the vehicle.

As many changes could be made in the above described construction and many apparently different embodiments of this invention could be made without departing from the scope thereof, it is intended that all matter contained in the above description or shown in the accompanying drawings shall be interpreted as illustrative and not in a limiting sense.

What is claimed is:

1. In an automotive vehicle, the combination with a body including a frame, of a running gear, means for resiliently supporting said body relative to said frame, said means having aligned pivotal elements connected with longitudinally spaced portion of said frame and constructed and arranged to oscillatively support said body about a predetermined axis, and torsional resistance means including a pair of plates each secured to an interposed block of resilient material for resiliently opposing relative angular movement of said body and running gear, one of said plates being axially fixed against rotation relative to said body and the other against rotation relative to said running gear.

2. In an automotive vehicle, the combination with a body including a frame, of an axle assembly, resilient means for supporting said body relative to said axle assembly while permitting relative rotation of the axle assembly and body, torsional resistance means including a pair of plates each secured to an interposed block of resilient material for resiliently opposing relative rotation of the axle assembly and body, means extending between one of said plates and the ends of the axle assembly for preventing relative rotation therebetween, and means for preventing rotation of the other plate relative to said central longitudinal axis of said frame.

3. In an automotive vehicle, the combination with a body including a frame, of an axle assembly, an inverted V shaped standard secured at the free ends of the legs thereof to points adjacent the ends of said axle assembly, said standard being provided with a vertically extending slideway at the apex thereof, means secured to said frame and arranged in said slideway for pivotally connecting said frame and axle assembly while permitting relative vertical movement therebetween, resilient means connecting said standard and said axle assembly for supporting said body resiliently on said axle assembly, and torsional resistance means connecting said standard and said frame for resiliently opposing relative pivotal movement of said frame and axle assembly.

4. In an automotive vehicle, the combination with a body including a frame and a front axle assembly including steerable wheels, of a rear axle assembly including wheels, means pivotally connecting said frame at a point spaced above the bottom thereof to said rear axle assembly while permitting relative vertical movement between the frame and the rear axle assembly, means resiliently supporting said frame relative to the rear axle assembly but offering practically no opposition to relative pivotal movement of the frame and axle assembly, means independent of said first-named resilient means for connecting said frame and rear axle resiliently to resist pivotal movement of the body with respect to the rear axle assembly, brace means connected to the rear axle assembly at points adjacent the ends thereof and extending forwardly beyond the center of the frame, and means for pivotally connecting the forward end of said brace means to said frame whereby the rear wheels tend to track the steerable front wheels during operation of the vehicle.

5. In an automotive vehicle, the combination with a body including a frame, a front axle assembly including steerable wheels and mechanism for steering said wheels, of a rear axle assembly including wheels, means pivotally connecting said frame at a point above the bottom thereof to said rear axle assembly while permitting relative vertical movement between the frame and the rear axle assembly, means resiliently supporting said frame relative to the rear axle assembly but offering practically no opposition to relative pivotal movement of the frame and rear axle assembly, means independent of said first-named resilient means for connecting said frame and rear axle assembly resiliently to oppose pivotal movement of the body with respect to the rear axle assembly, brace means connected to the rear axle assembly at points adjacent the ends thereof and extending forwardly beyond the center of the frame, and steering mechanism operable by said first-named steering mechanism and connected to the forward end of said brace for steering said rear axle assembly and wheels included therewith in the opposite direction from that in which the front wheels are steered to cause the rear wheels to track the front wheels during the operation of the vehicle.

6. In an automotive vehicle, the combination with a body including a frame, of an axle assembly, resilient means for supporting said body relative to said axle assembly while permitting relative rotation of the axle assembly and body, torsional resistance means including a pair of plates each secured to an interposed block of resilient material for resiliently opposing relative rotation of the axle assembly and body, means extending between one of said plates and the axle assembly for preventing relative rotation therebetween, brace means including resilient means connecting said last-named means to said frame, and means for preventing rotation of the other plate relative to the central longitudinal axis of said frame.

7. In an automotive vehicle, the combination of a body including a frame, of running gear pivotally connected to said frame about an axis inclined relative to both said frame and said running gear and approximately passing through the center of gravity of the body and an estimated average load, resilient means for supporting said body relative to said running gear, said resilient means being so constructed and arranged as to accommodate without deflection rotation of said frame relative to said running gear, and other resilient means independent of said first-named resilient means for resisting pivotal movement of said body with respect to said running gear.

8. In an automotive vehicle, the combination of a body including a frame, of running gear pivotally connected to said frame adjacent the front and rear ends thereof, the pivotal connection at the rear end of the frame being at an elevated point on the frame with respect to the pivotal connection at the front end of the frame, whereby the body and running gear are pivotally connected about a forwardly inclined axis passing slightly above the center of gravity of the body and an estimated average load, resilient means for supporting said body relative to said running gear and other resilient means independent of said first-named resilient means for resiliently resisting pivotal movement of said body with respect to said running gear.

9. In an automotive vehicle, the combination with a body including a frame, of a running gear pivotally connected to said frame about an axis extending substantially through the center of gravity of the body and extending at an inclination to the length thereof, a resilient support between said frame and running gear adapted to accommodate relative movement therebetween, and spaced resilient means opposing said relative movement independently of said resilient support, said members being disposed at an inclination with respect to the central longitudinal axis of said frame.

ROGER K. LEE.